June 23, 1942.  L. HORVITZ  2,287,101
MEANS AND METHOD FOR ANALYSIS
Filed Jan. 8, 1938  2 Sheets-Sheet 2

LEO HORVITZ
INVENTOR.
BY Jesse L. Stone
Lester B. Clark
ATTORNEYS

Patented June 23, 1942

2,287,101

UNITED STATES PATENT OFFICE 2,287,101

MEANS AND METHOD FOR ANALYSIS

Leo Horvitz, Houston, Tex., assignor to E. E. Rosaire, Houston, Tex.

Application January 8, 1938, Serial No. 183,960

8 Claims. (Cl. 23—232)

This invention relates to the arts of exploration for oil, gas, and related deposits by chemical methods, and to chemical analysis.

The invention relates to and broadly includes the subject matter of my copending application Serial No. 107,497, filed October 24, 1936, for Geophysical prospecting method.

Previous to the invention disclosed in the above mentioned application, soil gas was pumped or allowed to diffuse into a suitable container and subsequently analyzed for hydrocarbon contents. In accordance with the disclosure of the above mentioned invention, samples of soil are taken from the earth and transported to the laboratory in sealed containers for treatment and analysis. Such method involves utilization of the constituents entrained in the soil rather than depending solely on entrapped air or gas, where, by entrapped gas is meant the gas contained in the voids in the soil, and entrained constituents means those which are closely held by the soil as by solution or loose chemical combination, or in the cases of entrained gases, those which are held by occlusion or in combination.

The present invention has for its object the improvement of the analysis of the soil for the volatilizable entrained constituents. Methods and means are provided for causing the entrained gases to be evolved, and to analyze the evolved gases for significant content, where by significant content is meant those substances like methane and heavier hydrocarbons, hydrogen and/or carbon monoxide which are indicative of the presence of the sought deposits.

An object is to provide a sample which is richer in significant content than has heretofore been available; thus dilution by soil air which has obscured results in the past is reduced, so that the sensitivity of the analysis is greater.

Another object is to provide a treatment for the soil samples by which the entrapped air is withdrawn, (and in practice usually discarded), subsequent to which the entrained volatilizable constituents are caused to be liberated to form a sample for analysis.

A further object is to purify the gas sample obtained so that subsequent analysis can be accurate.

An object is to provide a method of analysis whereby light hydrocarbons and heavy hydrocarbons may be separated and analyzed. Among others, Collum, in Bulletin 201, Bureau of Mines (1922) has pointed out the relative importance of the light and heavy constituents. In the apparatus used in the present invention, the existence of hydrogen and carbon monoxide have been discovered as significant constituents. The separation of hydrogen and methane from ethane and heavier hydrocarbons is therefore one of the important objects of the invention.

Still another object is the provision of a method of and apparatus for separating the significant constituents into at least two fractions, the lighter fraction containing any hydrogen and/or carbon monoxide which may be present, together with methane, and the heavier fraction containing ethane and higher hydrocarbons.

Another object is to further analyze the heavier fraction when more detailed information is desired.

A further object is the provision of a mercury operated, mercury sealed valve which will operate satisfactorily at pressures substantially below atmospheric pressure when the pressure on the opposite sides of the valve differs by a considerable fraction of the pressure on either side.

Another object is to provide an apparatus for both sample treatment and gas analysis which is economically, rapidly and accurately operable, and which is sufficiently simple in operation that operators need only a short period of training.

These and other objects will become evident from study of the illustrations and description.

Figure 1:
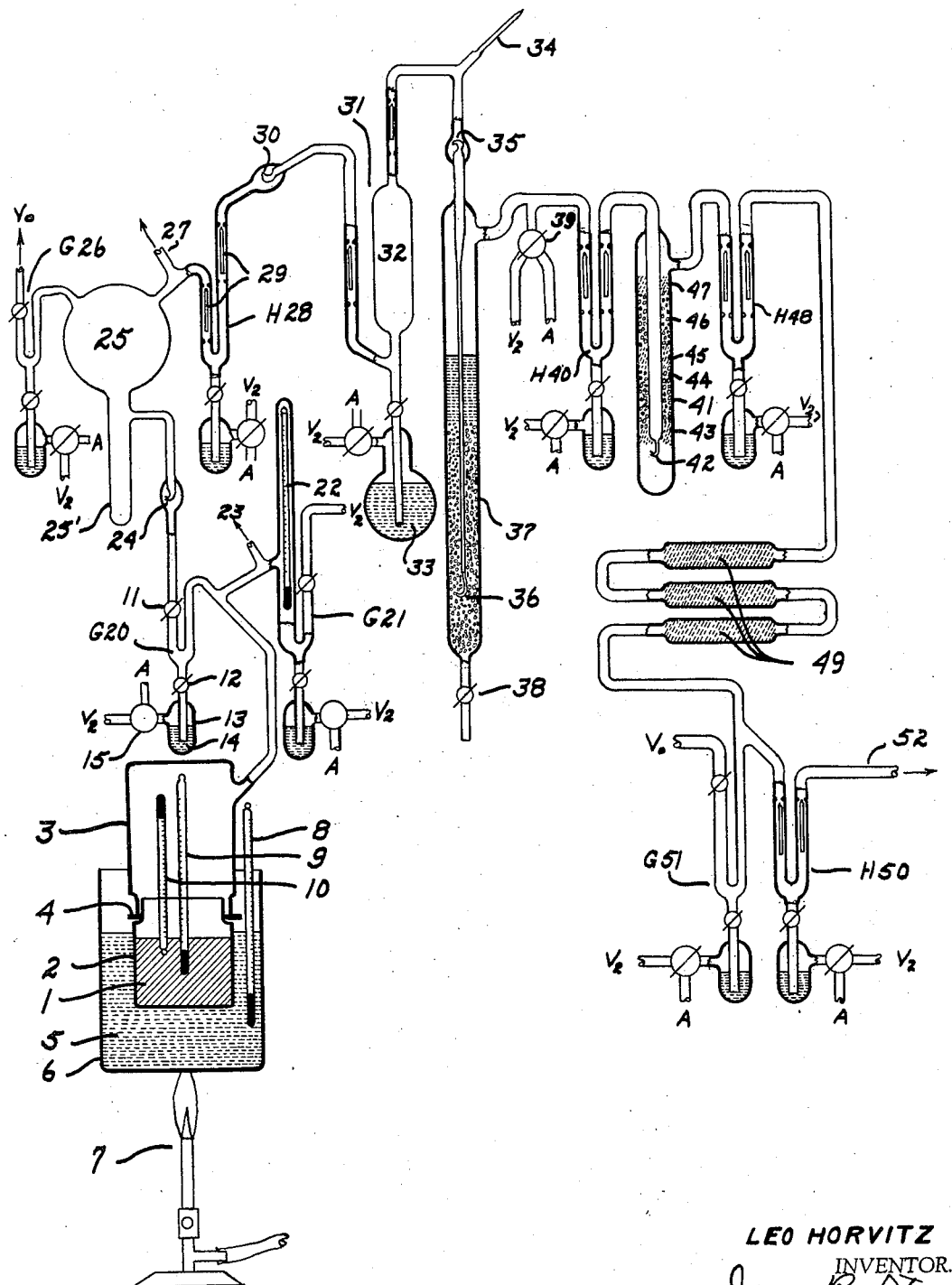
Fig. 1 is a detailed illustration of apparatus used in accordance with the present invention for the preparation of a gaseous sample for analysis.

In Fig. 1 the sample 1 is contained in a jar 2, within which the sample may have been enclosed when taken in the field. This jar is in sealed engagement with another jar 3 which is preferably about twice the volume of the jar 2, an arrangement which enables collection of a gas sample which contains very little moisture. A gasket 4 acts as a seal between the jars 2 and 3 which are secured together by suitable clamping means (not shown). After partial evacuation, say to 1/10 atmosphere, such clamping means is no longer necessary. Liquid bath 5 in container 6 and heat source 7 serve to heat-treat the sample and evolve the entrained gases. For the liquid bath 5 I have found water to be suitable. Thermometers 8 and 9 measure the temperatures of the water-bath and the sample and a maximum-registering thermometer 10 shows the maximum temperature which the gas sample in jar 3 has reached.

In accordance with the invention two types of mercury valves used, here designated as G and H types of which the construction and operation will be made apparent. The G valves are mercury U valves with a stop cock as shown. The H valves are slightly modified forms of a valve originated by Alfred Stock and are frequently referred to as Stock valves. See Alfred Stock, "Boron Hydrides," a book.

Valves G20 and G21 seal the sample from the remainder of the apparatus until it is desired to admit the gas. The parts of the G type valves are shown in G20 as comprising stop cocks 11 and 12, bulb 13, mercury pool 14, and three way cock 15. Tubes A and V₂ extending outwardly from the cock 15 communicate respectively with the atmosphere and a control suction line such as a water aspirator or a vacuum pump. Manipulation of cocks 12 and 15 permits mercury 14 to rise in the U shaped part of the valve, sealing the right from the left arm, or permits lowering the mercury to allow communication between the two arms.

Valve 21 is similar to valve 20 except that space is provided for a thermometer 22. A mercury manometer (not shown) is connected between valves 20 and 21 at 23 to measure the pressure in the sample chamber.

Capillary orifice 24, consisting of a tube end drawn down to small diameter, prevents mercury from being carried over into the flask 25 from the valves in case of sudden pressure changes. The flask 25 serves as a container for the sample of gas drawn from the soil sample. I prefer to make the volume of the flask 25 about half the volume of the jar 3. In connection with this correlation of parts it may be noted that the jar 3 is at least as large as the jar 2. This arrangement with the valves and control means illustrated, results in the collection of a gas sample which does not contain excessive moisture. In most cases the soil is wet or at least moist, and at the temperature to which it is heated the water vapor pressure is relatively high.

However, as the jar 3 remains relatively cool, the major portion of the moisture condenses on the walls of the jar whereby a refluxing action occurs. When valve 11 is opened to admit the gas to flask 25, the pressure is reduced and additional moisture is dropped before the gas sample passes into the flask 25.

Valve G26 seals this part of the apparatus from the main vacuum line V₀ which is continuously maintained at high vacuum by means of a 3-stage mercury vapor diffusion pump backed up by an oil pump as is well known in the art. A manometer is connected at 27 to determine the amount of free carbon dioxide in the gas sample. This determination is effected by successively applying to the depending portion 25¹ of the flask 25 low temperature baths such as a liquid nitrogen bath having a temperature of $-196°$ centigrade and an acetone dry ice bath having a temperature of $-80°$ C. The indicated pressure difference is proportional to the free carbon dioxide which may be then computed.

An H type valve 28 follows flask 25. The H valve is similar to the G valves except that instead of a stop cock 11 (as in G20), conical float stops 29 (in H28) are lifted to their seats by floating on the mercury. The operation of the G and H type valves is similar. Unlike the other H valves used, H28 is assymetrical, as shown, so that the differential mercury column aids in operating the valve when a pressure of 100 mm. or so would otherwise tend to hold the valve shut.

Capillary orifice 30 is similar to 24 and serves to keep mercury from being carried beyond the preceding valve. The modified Toepler pump 31 is similar to the H valves except that it has a large bulb, 32. I prefer to make the volume of bulb 32 about ¼ of the volume of flask 25. In bulb 32 gas at low pressure may be compressed by the mercury rising from reservoir 33. This pump serves to overcome the hydrostatic pressure in tube 37.

A convenient, though not strictly necessary component is the safety-capillary 34 which may be broken off to admit air and equalize pressures in case of accidental breakage in some part of the apparatus or for flushing out the tube 37.

Capillary orifice 35 is also similar to the orifice 24 and beyond this orifice a capillary tube 36 limits the gas velocity into the tube 37 which contains glass beads and a 50% solution of potassium hydroxide to remove carbon dioxide and any acidic constituents from the gas sample. The cock 38 serves to drain and refill tube 37. Three-way cock 39 is used to admit air to the apparatus at such times as are necessary, and for preliminary evacuation while tubes A and V₂ communicate with the atmosphere and a suction pump respectively. Valve H40 operates in a manner similar to valve H28 above described.

Tube 41 and velocity limiting capillary 42 feed the gas through anhydrous calcium chloride 44 and potassium hydroxide pellets 46 which are held in place by glass wool plugs 43, 45 and 47. The gas then passes through H valve 48 to tubes 49 which contain glass beads coated with phosphorus pentoxide powder to remove water vapor from the gas sample. Plugs of glass wool in each end of each tube 49 hold the phosphorus pentoxide in place.

Valve H50 separates the sample treatment portion from the analytical sections, and valve G51 provides a means for pumping out its corresponding part of the preparation section. Tube 52 communicates with the analytical portion of the apparatus.

Figure 2:
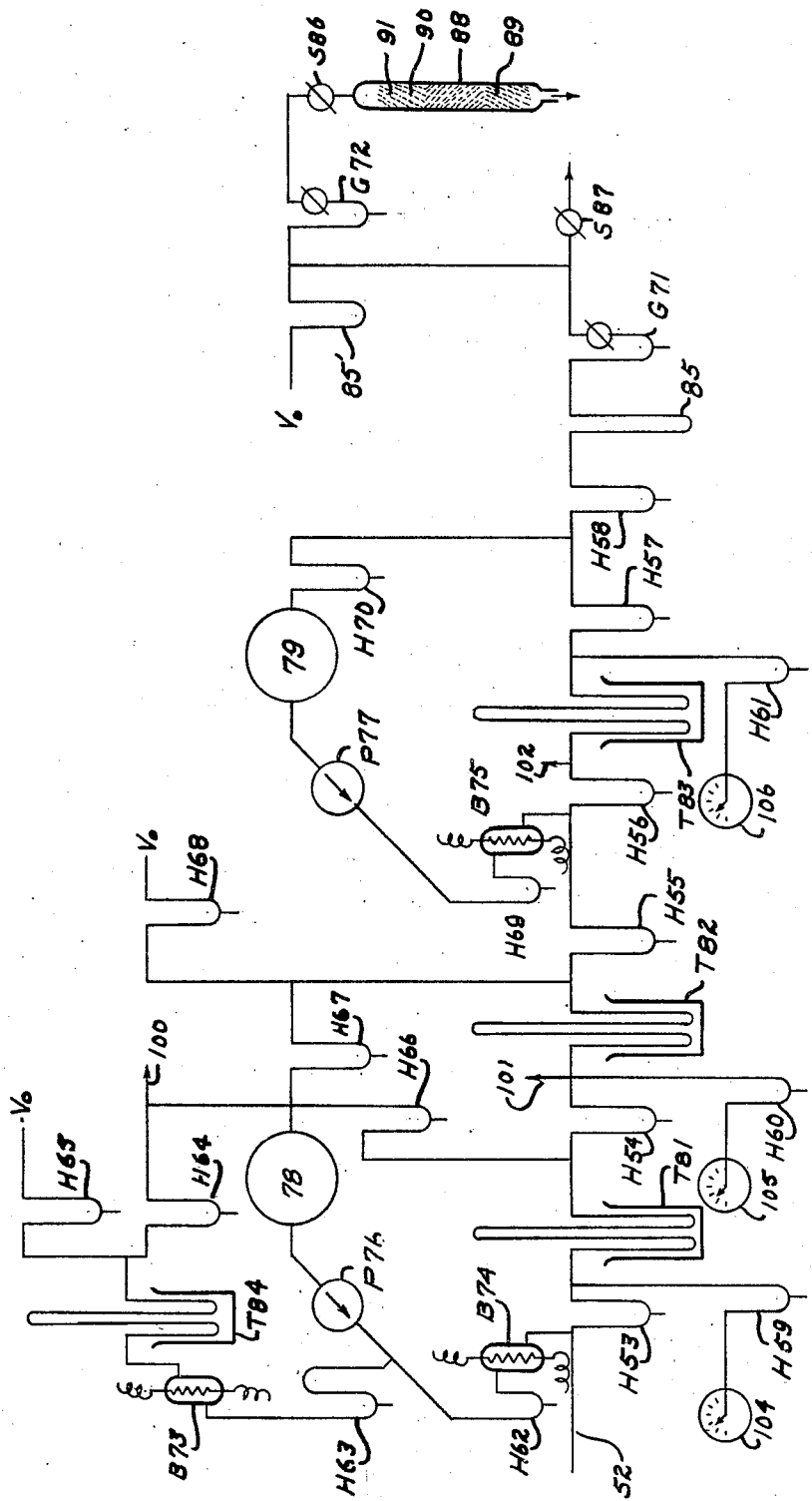
Fig. 2 is a diagrammatic illustration of the analytical portion of the apparatus, and while shown in a separate figure, this and the part illustrated in Fig. 1 are actually parts of the same whole, connected to the same vacuum pumps and other auxiliaries.

The gas analysis portion of the apparatus is illustrated in Fig. 2 wherein line tubing 52 is a continuation of this tube shown in Fig. 1. In discussing Fig. 2, it must be remembered that valve H50 in Fig. 1 serves when closed to seal off line 52.

Valves H53 to H70 are identical to the valve H40 in Fig. 1, and G71 and 72 are mercury valves identical to the valve G26 in Fig. 1. Burners B73, B74 and B75 are combustion tubes consisting of platinum wire filaments sealed into tubing through which the gas may circulate. They are heated by an electric current source (not shown) and controlled by suitable switches (not shown). Pumps P76 and P77 are mercury vapor pumps used to circulate the gas. The direction of circulation is shown by arrows.

Flask 78 is a reservoir for oxygen or air used in the combustion of the heavier constituents.

Flask 79 is a reservoir in which the sample is allowed to be drawn after removed of ethane and heavier constituents in the traps to be hereinafter described.

Traps T81, T82, T83 and T84 consist of tubing suitably arranged for immersion in cold baths such as liquid air for freezing out certain components. These traps have a plurality of low temperature portions with intervening reheating portions as described in my copending application Serial No. 124,652, filed Feb. 8, 1937, for Gas separation.

The U tubes 85 and 85' are traps, immersed in liquid nitrogen used to increase the efficiency of the vacuum pumps. Also, a leaking stopcock on the vacuum side permitting entrance of air would be harmful to the analysis if carbon dioxide and water vapor entered the system, but by removing the carbon dioxide and water vapor, the entrance of air is not harmful.

Valves S86 and S87 are stopcocks suitable for use in high vacuum applications.

Tube 88 is provided for admitting to the apparatus air which is free from water vapor and carbon dioxide. This tube contains granulated anhydrous calcium chloride at 89 and 91, and dry powdered potassium hydroxide at 90, separated by plugs of glass wool.

Manometers 100, 101, 102 are provided at the points indicated for measuring gas pressures and suitable low-pressure gauges 104, 105, 106 are connected at the points shown.

Preliminary to the extraction and analysis of gas from a soil sample the apparatus beyond the valve H28 is evacuated to as low a pressure as is permissible in the presence of the aqueous solution in tube 37. Between the valves H40 and H50, the apparatus is pumped down to $10^{-5}$ millimeters of mercury through valve G51 and vacuum line $V_0$ to the vapor pump. All the apparatus shown in Fig. 2 is evacuated to $10^{-5}$ millimeters of mercury, heat being applied to the apparatus to liberate occluded gases insofar as possible, a step referred to as flaming.

Air or oxygen is then admitted by letting it bubble through valve G72 by partially opening it and opening cock S86. Liquid nitrogen around trap 85' prevents passage of water vapor or carbon dioxide. The contents of tube 88 assures that the air admitted is substantially free from moisture and carbon dioxide. Valves H65, H63, and H64 are opened and the air collected in flask 78 until a pressure of about 20 mm. is reached (as read on the manometer 100) after which cock S86, valves G72 and H65 are closed. Vacuum line $V_0$ is then evacuated again by opening cock S87, removing the nitrogen bath from trap 85' and flaming out the tubing being pumped.

A liquid nitrogen bath is placed around trap T84, burner 73 is energized and the pump P76 is started and circulation is continued for a half hour. This step is to remove any possible combustible material from the oxygen or air which is to be used in the combustion of the constituents from which the air has been pumped. During circulation and combustion, reservoir 78 is flamed to evolve any absorbed gases.

Valves H63 and H64 are then closed, the liquid nitrogen bath is removed from trap T84, the valve H65 is opened and the trap pumped out. Trap T84 is flamed out, and the valve H65 is again closed. The preparation of the air or oxygen in the flask 78 may be performed during the time some other operation is being carried out, such as preparing the soil sample.

In operation the sample is brought from the field or from storage and weighed, and a small quantity is removed for moisture content determination. The jar 2 is fitted to the container 3 after inserting the thermometers 9 and 10 as shown. Up to this point all valves have been closed; the apparatus has previously been evacuated as above indicated. After the sample jar is clamped in position the valve G21 is opened and the pressure in the sample jar is reduced to about 100 millimeters of mercury. A pressure materially below 100 millimeters of mercury is to be avoided to prevent too high a moisture content in the gas sample. A pressure of 100 millimeters of mercury comprises from 20 to 40 millimeters of water vapor pressure, the remainder representing the pressure of the entrapped gas and air. In this manner approximately 95% of the entrapped air is eliminated. In event of air contamination by leakage in the apparatus, the pressure may be reduced to that of the vapor pressure of water at room temperature and air or oxygen freed of combustible material introduced into the jar 3 to bring the pressure up to 75 to 100 millimeters of mercury.

The valve G21 is then closed and sealed by elevating mercury from the mercury reservoir. The water bath 5 in the container 6 with thermometer 8 is then put in position about the container 1 and heat is applied. Heating is continued for about a half hour after boiling temperature is reached. The pressure within the container 3 and the jar 2 rises materially during the heating of the sample therein. The valve G20 is then opened and a gas sample is collected in flask 25 until the pressure in the flask is about 100 millimeters of mercury when the valve G20 is again closed.

The Toepler pump 31 is opened by lowering the mercury to permit filling of bulb 32, valves H40 and H48 being partially opened so that gas can pass slowly therethrough. During this procedure the valve H50 is opened wide and the valve H28 is then partially opened by lowering the mercury part way down the U-tube letting the float valves open, whereupon gas from the sample within the flask 25 passes forward within the device.

A liquid nitrogen bath is placed around traps T81 and T82. Valves H53 to H57, H69 and H70 are opened, and the gas sample is allowed to fill the analytical sections.

When gas stops bubbling through potassium hydroxide tube 37, valve 28 which has been only partially open is gradually opened wide. The Toepler pump 31 is then operated by successively raising and lowering the mercury therein. Pumping is continued until a pressure of about 20 millimeters of mercury is reached in the analytical section as read on the manometer 101. Most of the sample is then contained in flask 79, with the remainder, say 10 to 20% distributed along the various traps and tubing. Valves H50 and H55 are then closed. Trap T81 now contains condensed heavy constituents and a small amount of gas at about 20 millimeters pressure. The gaseous part is pumped off through valve H68 until the pressure as read on gauges 104 or 105 is about $10^{-4}$ millimeters of mercury, after which the valve H68 is closed.

In flask 79 there remains a gas sample at 20 millimeters which contains any constituents lighter than ethane. Analysis for light constituents may now be started. A liquid nitrogen bath is placed around trap T83. Pump P77 is started, burner B75 is energized and circulation is continued until all combustible materials are burned; five to fifteen minutes suffices. A precaution that the gas velocity will be low during at least a part of the combustion time may be taken by stopping pump P77 for a few minutes.

The trap T83 now contains the products of combustion namely condensed water vapor and carbon dioxide, and the circulaitng system contains some gas. This gas is then pumped off through valves H58 and G71 until the pressure gauge 106 reads $10^{-4}$ millimeters of mercury or lower. Valves H56 and H57 are closed and a bath of acetone and dry ice is substituted for the nitrogen bath around trap T83. The carbon dioxide evaporates and its pressure is read on the gauge 106 from which data, and the volume, the quantity of carbon dioxide may be found. The acetone and dry ice bath is then removed and the trap T83 allowed to return to room temperature whereupon the combined water vapor and carbon dioxide pressures are measured and the water vapor content may be computed from such measurement. Alternately, the carbon dioxide may be pumped off before warming the trap T83, and the water measured by itself.

The water and carbon dioxide amounts may then be used to compute the amount of methane present in the gas sample. Excesses of either indicate the presence of either hydrogen or carbon monoxide. When small quantities of methane are present, a deficiency of water content results, which may be in part overcome by the use of a very fine filament in the burner B75, and compensation made by calibration for known amounts of pure methane and air. I have found a practical size of burner filament is a short length of No. 32 B and S gauge platinum.

Next the ethane and higher order constituents contained in trap T81 may be analyzed. This may be done all at once, but the apparatus is adapted to separate this constituent into an intermediate and a heavy fraction, and the description will show how these are analyzed separately. It will be obvious how the analysis could be carried out if these fractions were left combined.

To obtain the two fractions, the nitrogen bath around the trap T81 is replaced by an acetone-dry ice bath. The intermediate cut evaporates off and is collected in the trap T82 around which the nitrogen bath has been left, and the heaviest cut remains in the trap T81. The valve H54 is then closed and the valve H60 opened, the contents of trap T82 being allowed to evaporate and the quantity measured by reading the pressure on gauge 105. The intermediate fraction is re-condensed in the trap T82 by replacement of the nitrogen bath, and the gauge 105 is closed off through the valve H60. Numerous experiments indicate that the intermediate cut consists mainly of ethane.

The quantity of the heavy cut remaining in trap T81 is measured by closing off valve H53, opening the valve H59, allowing the contents of the trap T81 to evaporate at room temperature, and reading the gauge 105, after which the fraction is again condensed in T81 with the acetone-dry ice bath.

The intermediate cut is next subjected to combustion by opening the valves H53, H54, H67 and H62, the trap T82 being warmed to room temperature. The burner B74 is then heated, and circulating pump P76 is started. Circulation with the air or oxygen already prepared in flask 78 is allowed to continue for a few minutes. The trap T82 is then surrounded by a nitrogen bath and the carbon dioxide produced during combustion is collected by continuing circulation for another ten minutes. The valves H53 and H67 are then closed, and the traps T81 and T82 are pumped out through valve H68 to remove the air until the gauge 105 reads $10^{-4}$ millimeters of mercury or lower, valve H60 being opened to obtain a reading. Valves H54 and H68 are closed again and the contents of the trap T82 are allowed to evaporate at the temperature of an acetone-dry ice bath and the pressure is read on gauge 105. This gives the amount of carbon dioxide obtained on combustion from which the amount of the intermediate fraction or cut is computed. By obvious steps the water produced by combustion may also be measured if desired.

After this operation trap T82 is evacuated. Any possible residual from the analysis of the intermediate cut is eliminated by circulating the air or oxygen in the system 78, P76, B73 and T84, while flaming the flask 78, burning the circulated residual in B73 and condensing the products of combustion in the trap with a liquid nitrogen bath.

Analysis of the heaviest fraction is carried out by allowing it to evaporate, circulating it past the heated burner B74 for a few minutes, and while circulation continues, condensing the products of combustion in the trap T81 with a liquid nitrogen bath. Valves H53 and H66 are closed, valve H54 is opened and the air pumped out of the trap T81 through the valve H68. When the pressure is down to $10^{-4}$ millimeters of mercury or lower, the trap T81 is isolated, the contents are allowed to evaporate at the temperature of an acetone-dry ice bath and the pressure of the carbon dioxide measured. The water vapor may also be measured if desired.

In the foregoing description cold baths of liquid nitrogen and acetone-dry ice have been mentioned specifically because the temperatures of approximately $-196°$ centigrade and $-80°$ centigrade are very convenient. Other baths at slightly different temperatures are satisfactory; for example, liquid air has been used in place of liquid nitrogen, and ethanol has been used in place of acetone in the acetone-dry ice bath. Nitrogen is to be preferred to air because the lower temperature reduces the vapor pressure of some constituents of the gas, and also because of the eliminated fire hazard.

In the specification and claims, the term "substantially free" is used to designate a substance which contains less than one part per million of the impurity.

While a detailed description of the preferred embodiment of the invention has been given in order to impart a full, clear and exact understanding of the invention, it is to be understood that the invention is not limited to the disclosed procedure and construction, the invention being defined by the scope of the appended claims and modifications may be made without departing from the invention.

What is claimed is:

1. A gas analysis apparatus comprising a closed cycle through which gas may be continuously circulated, a refrigerating zone in said cycle, a combustion zone in said cycle, means for circulating gas around said cycle, a pressure indicating means in said cycle, means for introducing gas to be analyzed into said cycle and means for withdrawing gas from said cycle.

2. An apparatus for analyzing a gas containing condensible combustible constituents comprising a receptacle for holding a gas sample, a conduit connected to said receptacle, means for sealing the ends of said conduit, a trap arranged in said conduit, means for applying refrigeration to said trap, a circulating loop having its ends connected to said conduit on either side of said trap, a combustion chamber in said loop, means associated with said loop for indicating the pressure therein, and a circulating pump in said loop.

3. An apparatus for analyzing gas containing condensible combustible constituents of different boiling points comprising a receptacle for the gas sample, a conduit connected to said receptacle having means for sealing its ends, a plurality of traps arranged along said conduit, means for applying refrigeration to each of said traps, a plurality of independent circulating loops connected to said conduit, each of said loops including at least one of said traps, a combustion chamber in each of said loops, means associated with each loop for indicating the pressure therein, and a circulating pump in each of said loops.

4. In a method of soil gas analysis for minute traces of hydrocarbons heavier than methane present together with methane in soil gas, the steps which comprise condensing all of said heavier hydrocarbons, without condensing any substantial amount of the methane, at a temperature of approximately $-196°$ C., quantitatively removing any residual methane from said condensed hydrocarbons in a single operation, while maintaining them at said temperature, without removing any substantial amount of said heavier hydrocarbons by reducing the pressure on the condensed hydrocarbons to a pressure not substantially above $10^{-4}$ mm. of mercury, and determining the amount of the residual heavier hydrocarbons.

5. In a method of soil gas analysis for minute traces of hydrocarbons heavier than methane present together with methane in soil gas, the steps which comprise condensing all of said heavier hydrocarbons without condensing any substantial quantity of methane at a temperature of approximately $-196°$ C., quantitatively removing any residual methane from the condensate in a single operation, while at the aforesaid temperature, without removing any of said heavier hydrocarbons by reducing the pressure on the condensate to a value not substantially above $10^{-4}$ mm. of mercury, and determining the quantity of said heavier hydrocarbons by a procedure involving vaporization thereof and measuring the vapor pressure thereof.

6. In a method of soil gas analysis for minute traces of methane and heavier hydrocarbons present together with methane in said soil gas, the steps which comprise condensing all of said heavier hydrocarbons without condensing any substantial portion of the methane at a temperature of approximately $-196°$ C., quantitatively removing any residual methane from the condensate, while at the aforesaid temperature, without removing any of said heavier hydrocarbons by reducing the pressure on said condensate to a value not substantially above $10^{-4}$ mm. of mercury, burning the residual hydrocarbons, condensing the carbon dioxide formed, removing fixed gases by application of a high vacuum, vaporizing the $CO_2$ and measuring the pressure of the $CO_2$ vapors as an index of the amount of said ethane and said heavier hydrocarbons present in the sample.

7. In a method of soil gas analysis for minute traces of hydrocarbons heavier than methane present together with methane in said soil gas, the steps which comprise admitting the gas to be analyzed to a closed system maintained at a pressure of about 20 mm. of mercury, refrigerating a zone of small volume within the system to about $-196°$ C. to condense the hydrocarbons heavier than methane without condensing any substantial amount of the methane, isolating the contents of the refrigerated zone from the relatively larger volume of the remainder of the closed system, removing non-condensed constituents from the refrigerated zone by reducing the pressure therein to the order of $10^{-4}$ mm. of mercury whereby any constituent boiling lower than ethane is removed from said refrigerated zone, and determining the amount of the hydrocarbons remaining in said refrigerated zone.

8. A method according to claim 7 in which the temperature of the refrigerated zone is raised to $-80°$ C., the resulting vapors are condensed in a second refrigerated zone maintained at $-196°$ C., and the condensates in the two zones are measured separately.

LEO HORVITZ.